United States Patent
Bostick et al.

(10) Patent No.: US 10,244,204 B2
(45) Date of Patent: Mar. 26, 2019

(54) DYNAMIC PROJECTION OF COMMUNICATION DATA

(71) Applicant: International Business Machines Corporation, Armonk, NY (US)

(72) Inventors: James E. Bostick, Cedar Park, TX (US); John M. Ganci, Jr., Cary, NC (US); Martin G. Keen, Cary, NC (US); Sarbajit K. Rakshit, Kolkata (IN)

(73) Assignee: International Business Machines Corporation, Armonk, NY (US)

( * ) Notice: Subject to any disclaimer, the term of this patent is extended or adjusted under 35 U.S.C. 154(b) by 0 days.

(21) Appl. No.: 15/465,818

(22) Filed: Mar. 22, 2017

(65) Prior Publication Data
US 2018/0278887 A1    Sep. 27, 2018

(51) Int. Cl.
| | |
|---|---|
| G06F 3/16 | (2006.01) |
| G06K 9/00 | (2006.01) |
| G06T 7/73 | (2017.01) |
| H04N 7/14 | (2006.01) |
| G06T 7/246 | (2017.01) |

(52) U.S. Cl.
CPC ............ *H04N 7/147* (2013.01); *G06F 3/16* (2013.01); *G06K 9/00255* (2013.01); *G06T 7/246* (2017.01); *G06T 7/73* (2017.01); *H04N 7/142* (2013.01); *G06T 2207/30201* (2013.01)

(58) Field of Classification Search
CPC combination set(s) only.
See application file for complete search history.

(56) References Cited

U.S. PATENT DOCUMENTS

| | | | |
|---|---|---|---|
| 7,134,080 B2 | 11/2006 | Kjeldsen et al. | |
| 8,840,250 B1 * | 9/2014 | Yao | G01S 17/46 345/633 |
| 9,167,289 B2 | 10/2015 | Stinson, III et al. | |
| 9,245,387 B2 | 1/2016 | Poulos et al. | |
| 9,509,981 B2 | 11/2016 | Wilson et al. | |
| 2011/0002020 A1 | 1/2011 | Khan | |
| 2011/0249087 A1 | 10/2011 | Tsang et al. | |
| 2014/0380230 A1 * | 12/2014 | Venable | G06F 3/013 715/781 |
| 2015/0370323 A1 * | 12/2015 | Cieplinski | G06F 3/013 345/156 |
| 2016/0005320 A1 * | 1/2016 | deCharms | G09B 5/065 434/236 |

(Continued)

OTHER PUBLICATIONS

Mell et al., "The NIST Definition of Cloud Computing", Recommendations of the National Institute of Standards and Technology, NIST Special Publication 800-145, U.S. Department of Commerce, Sep. 2011, 7 pages.

*Primary Examiner* — Phung-Hoang J Nguyen
(74) *Attorney, Agent, or Firm* — Daniel C. Housley

(57) ABSTRACT

A computer system may be used to project a communication to a user. The system may analyze camera data to detect the facial direction and location of a user. The system may also receive a communication for the user. The system may receive the communication from a user device associated with the user. Based on the detected facial direction and location of the user, the system may determine a target location for the projection. The system may identify a set of visual projectors based on the target location and transmit the communication data and the target location to the projectors.

14 Claims, 8 Drawing Sheets

(56) References Cited

U.S. PATENT DOCUMENTS

| | | | |
|---|---|---|---|
| 2016/0195849 A1* | 7/2016 | Takagi | G03H 1/2249 |
| | | | 348/40 |
| 2016/0284121 A1* | 9/2016 | Azuma | H04N 7/157 |
| 2016/0364087 A1* | 12/2016 | Thompson | G06F 3/0481 |
| 2017/0090418 A1* | 3/2017 | Tsang | G03H 1/0841 |
| 2017/0177078 A1* | 6/2017 | Henderek | G06F 3/013 |
| 2017/0177079 A1* | 6/2017 | George-Svahn | G06F 3/013 |
| 2017/0185760 A1* | 6/2017 | Wilder | G06F 21/32 |

* cited by examiner

DYNAMIC PROJECTION OF COMMUNICATION DATA

BACKGROUND

The present disclosure relates to computer systems, and more specifically, to transmitting messages using projections.

Digital communications may be performed in a home, office, or other space over a mobile device. For example, a user may send or receive an email, send a text message, or participate in a video conference. Communication may be sent or received directly from the mobile device, or the communication may use a larger display device, for example, a smart TV, in order to deliver the message to the recipient.

Holographic image projectors may project computer-generated holographic images in midair. Holography can effectively display images and text by exploiting properties of light, specifically by diffracting light to reproduce a reproduction of an original light field.

SUMMARY

Embodiments of the present disclosure may be directed toward a method executed by a computer system, which includes analyzing camera data from a set of one or more cameras. The method may also include detecting, by the computer system and based on the camera data, a facial direction of the user. The user may be associated with one or more devices. The computer system may also detect based on the camera data a location for the user. The system may then receive from at least one of the user devices associated with the user, a communication for the user. The communication may include communication data. The system may determine, based on the facial direction and location of the user, a target location and identify, based on the target location, a set of one or more visual projection devices for use in projecting the communication data. The system may then transmit to the visual projection devices, the communication data and the target location.

Embodiments of the present disclosure may be directed toward a computer system comprising at least one computer processor circuit configured to perform a method which includes analyzing camera data from a set of one or more cameras. The method may also include detecting, by the computer system and based on the camera data, a facial direction of the user. The user may be associated with one or more devices. The computer system may also detect based on the camera data a location for the user. The system may then receive from at least one of the user devices associated with the user, a communication for the user. The communication may include communication data. The system may determine, based on the facial direction and location of the user, a target location and identify, based on the target location, a set of one or more visual projection devices for use in projecting the communication data. The system may then transmit to the visual projection devices, the communication data and the target location.

Embodiments of the present disclosure may be directed toward a computer program product with a computer readable storage medium, where the computer readable storage medium has program instructions embodied therewith, and where the computer readable storage medium is not a transitory signal per se. The program instructions may be executable by a computer processing circuit to cause the circuit to perform a method which includes analyzing camera data from a set of one or more cameras. The method may also include detecting, by the computer system and based on the camera data, a facial direction of the user. The user may be associated with one or more devices. The computer system may also detect based on the camera data a location for the user. The system may then receive from at least one of the user devices associated with the user, a communication for the user. The communication may include communication data. The system may determine, based on the facial direction and location of the user, a target location and identify, based on the target location, a set of one or more visual projection devices for use in projecting the communication data. The system may then transmit to the visual projection devices, the communication data and the target location.

The above summary is not intended to describe each illustrated embodiment or every implementation of the present disclosure.

BRIEF DESCRIPTION OF THE DRAWINGS

The drawings included in the present application are incorporated into, and form part of, the specification. They illustrate embodiments of the present disclosure and, along with the description, serve to explain the principles of the disclosure. The drawings are only illustrative of certain embodiments and do not limit the disclosure.

Figure 1:
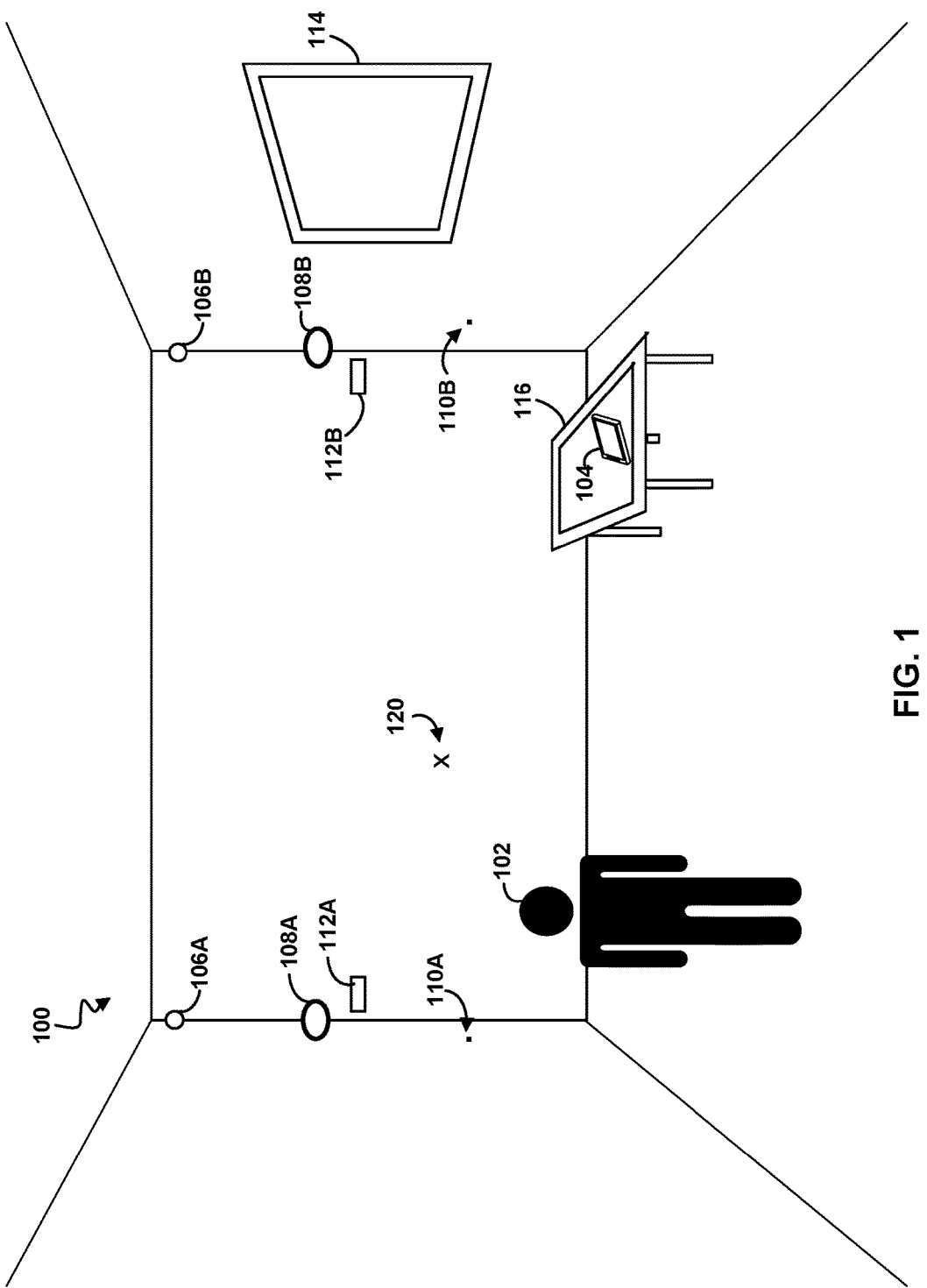
FIG. 1 depicts an environment for delivering a message to a user based on the user's location, according to embodiments.

While the invention is amenable to various modifications and alternative forms, specifics thereof have been shown by way of example in the drawings and will be described in detail. It should be understood, however, that the intention is not to limit the invention to the particular embodiments described. On the contrary, the intention is to cover all modifications, equivalents, and alternatives falling within the spirit and scope of the invention.

DETAILED DESCRIPTION

Aspects of the present disclosure relate to computer systems; more particular aspects relate to digital communications. While the present disclosure is not necessarily limited to such applications, various aspects of the disclosure may be appreciated through a discussion of various examples using this context.

Various embodiments are directed toward a computer system that may be configured as part of a smart home ecosystem to detect changes in a user's location and facial direction in order to project communications to the user while he or she moves about the space. A smart room or smart home ecosystem may include one or more cameras, microphones, digital projectors, holographic projectors, pico projectors, digital displays, speakers, and other audio or visual devices, any or all of which may be in communication with the computer system, with each other, or both. These devices may also be capable of capturing and streaming video and audio, for example a web camera on a desktop computer, a virtual reality (VR) camera, or a microphone-enabled digital assistant. These devices may be attached to walls and ceilings throughout the space. They may be fixed with a pivotal join and with a motor, in order to enable the devices to have a wide range of motion.

In some cases, a user or users may be in the smart space. Each user may have one or several devices associated with him or her (e.g., via an account or log in into a device like a smart phone or tablet). The system may be configured to detect data from a camera feed received from a camera or cameras installed throughout the space. The system can analyze the data from the camera feed and detect the direction a particular user is facing or looking. The system can also detect, using the camera feed or other sensors, the particular user's location within the space. The camera feed data can be streamed continuously, and the computer system may be repeatedly identifying the location and facial direction of one or more users simultaneously.

In embodiments, the system may receive a communication for the user, via one or more of the particular user's devices. For example, the device may be paired with the system and may notify the system of an incoming video call request for the particular user. The system may use the identified facial direction and location of the user to determine a target location for the communication request to be projected or displayed. Based on the target location, the system may then identify a set of one or more of the smart space ecosystem's audiovisual devices that are suitable for projecting the communication (e.g., the video call request) to the user. For example, the system may identify a projector and a speaker near the user. The system can then transmit the communication data to the device(s) (e.g., the projector and the speaker), for projection to the user. As the user moves about the space, the camera feed or other sensors within the space may detect changes in the facial direction, the location, or both, of the user. Responsive to this or these changes, the system may recalculate the target location for the projection of the communication.

In embodiments, the system may then determine if one or more different audio or visual devices are better suited for projection of the communication. The system may determine that the particular audio or visual device is still the suited to project the communication, but that the device must be rotated or adjusted in some other way. The system may then communicate the necessary modifications to the audio or visual device, in order to project the communication to the modified location and or facial direction of the user. In embodiments, the system may determine that one or more different audio or visual devices is better suited for projection. In this case, the system may transmit the data and recalculated target location to the new device(s). The system may enable a seamless transition between the devices, in order to provide for an uninterrupted projection. In embodiments, the transition between the devices could occur with a break, be projected using overlapping devices, or in another way, for example based on a user setting.

The system may also receive and transmit communications from the user. For example, as stated herein, the smart space ecosystem may comprise microphones and cameras. The system may receive, from appropriate microphones and cameras, communication data to be transmitted to the user device. This receipt and transmittal may occur in conjunction with the transmittal of communication data from the user device to the audio and/or visual projection devices. For example, the system may communicate an incoming video call request from the user device to the user. The system may detect, via the microphone(s) and the camera(s) surrounding the user, that the user has indicated an acknowledgement of the notification.

FIG. 1 depicts an environment 100 for delivering a message to a user based on the user's location, according to embodiments. The environment 100 may be a smart space, for example a smart home, a smart office, or some other technological ecosystem equipped with devices to interact with a user 102. For example, the environment 100 may be equipped with various cameras 106A and 106B. The environment may also have various audio and visual devices installed throughout the space. For example, the audio and visual devices may include a set of projectors 108A and 108B, a set of microphones 110A and 110B, and a set of speakers 112A and 112B. The projectors 108A and 108B may be holographic projectors, which can project images without the need for a screen or into midair. The projectors may also be pico projectors which can project the communications onto traditional surfaces such as screens and walls. In embodiments, the projectors 108A and 108B as well as the other smart space devices (e.g., the cameras 106, microphones 110 and speakers 112) may be equipped with one or more pivot joins and motors, in order to allow them to be adjusted and controlled by the computer system. The environment 100 may also have one or more displays 114 throughout. For example, display 114 may be a computer monitor, a smart TV screen, a digital photo frame, or other display.

In embodiments, a user device 104 may be in the environment 100 which may be the same room, a different room in a house or building, or in another location where it is available to send and receive communications from the computer system. These communications may be sent over one or more networks. The networks can include, but are not limited to, local area networks, point-to-point communications, wide area networks, the global Internet, and combinations thereof. The user device 104 may be located remotely from the user 102, for example as depicted herein, on a table 116 across the room.

According to embodiments, and as described above, the cameras 106 in the environment 100 may use a detected location of the user 102 as well as an indication of the user's facial direction in order to determine a target location 120. This target location 120, depicted with an "x" in FIG. 1 may be a location on a wall, on a display device (e.g., display 114), or a point in space in the environment 100.

Figure 2:
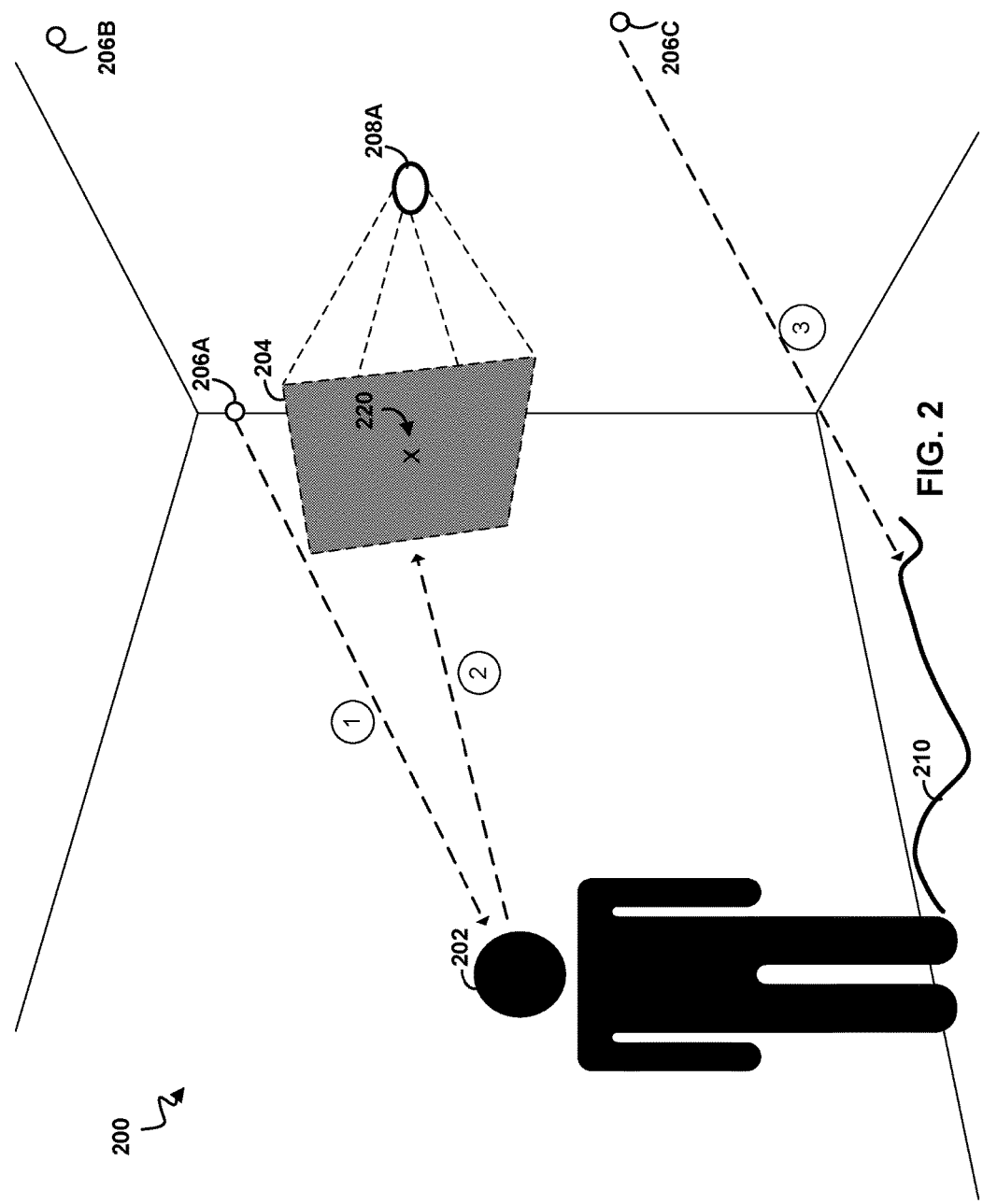
FIG. 2 depicts an environment for projecting a message to a user, according to embodiments.

FIG. 2 depicts an environment 200 for projecting a message to a user, according to embodiments. In embodiments, environment 200 may be similar to that of environment 100 as depicted in FIG. 1, with like parts corresponding with like. For example, user 202 may be the same as user 102 of FIG. 1 and maybe associated with a user device like user device 104 in FIG. 1 (not pictured in FIG. 2).

Like the environment 100 described in FIG. 1, the environment 200 of FIG. 2 may comprise an ecosystem of connected cameras 206A, 206B, and 206C, and projectors 208A. The environment 200 may also comprise a set of speakers, microphones, displays, and other audiovisual devices not pictured.

According to embodiments, a camera or cameras 206 within the environment 200 may detect a user 202 in the space. A camera 206A may detect the facial direction of the user 202, as depicted at (1). At the same or different time, another camera 206C may detect the location of the user 202. The camera 206C may also detect a travel path 210 of the user 202. The computer system (not pictured here) can analyze the data in the camera feeds, and determine a target location 220 for a projection of a received communication (e.g., on a user device associated with the user 202, when the device is located in another room). Responsive to the determining, the system can identify a projector, for example projector 208A, as a device suitable to displaying the communication to the user 202. The projector 208A can then project the communication (e.g., a video conference stream) to the target location 220. As depicted herein, the projection may be a midair projection 204. The user 202 can then view the projection, as depicted at (2), and respond as appropriate.

As depicted at (3), the camera 206C may continue to detect a location of the user 202. For example, the camera feed from camera 206C may depict a changed location of the user 202 to the computer system. Based on this changed location and travel path 210 of the user, the system may modify the target location 220 for the projection 204, and cause the projector 208A to adjust in accordance with the change in location of the user 202. In this way, the projection 204 may continue to be viewed by the user 202, even as he or she moves throughout the environment 200. In some embodiments, the travel path 210 of the user 202 may allow for a different projector or display device (not pictured) to be used to continue the communication.

In embodiments, the projector 208A in the set of projection devices 208, the camera 206C, from the set of cameras, or any other suitable visual apparatus in the environment may collect visual data responsive to the projection of the communication to the user. For example, the camera 206C may continue to provide the camera feed data of the user to the computer system. For example, the projector 208A may be enabled to collect visual data during or after its projection 204 of the communication to the user 202. The visual data may be received by the computer system and transmitted to the user device.

In embodiments, a set of microphones in the space may collect a set of audio data and transmit it to the computer system. The computer system may receive the audio data and transmit the audio data to the user device. In embodiments, the computer system may analyze the audio data in order to detect a particular user, filter the audio data for clarity, or for some other purpose. In embodiments, the audio data may be transmitted concurrent with the visual data, for example, in the case of a video conference call.

Figure 3:
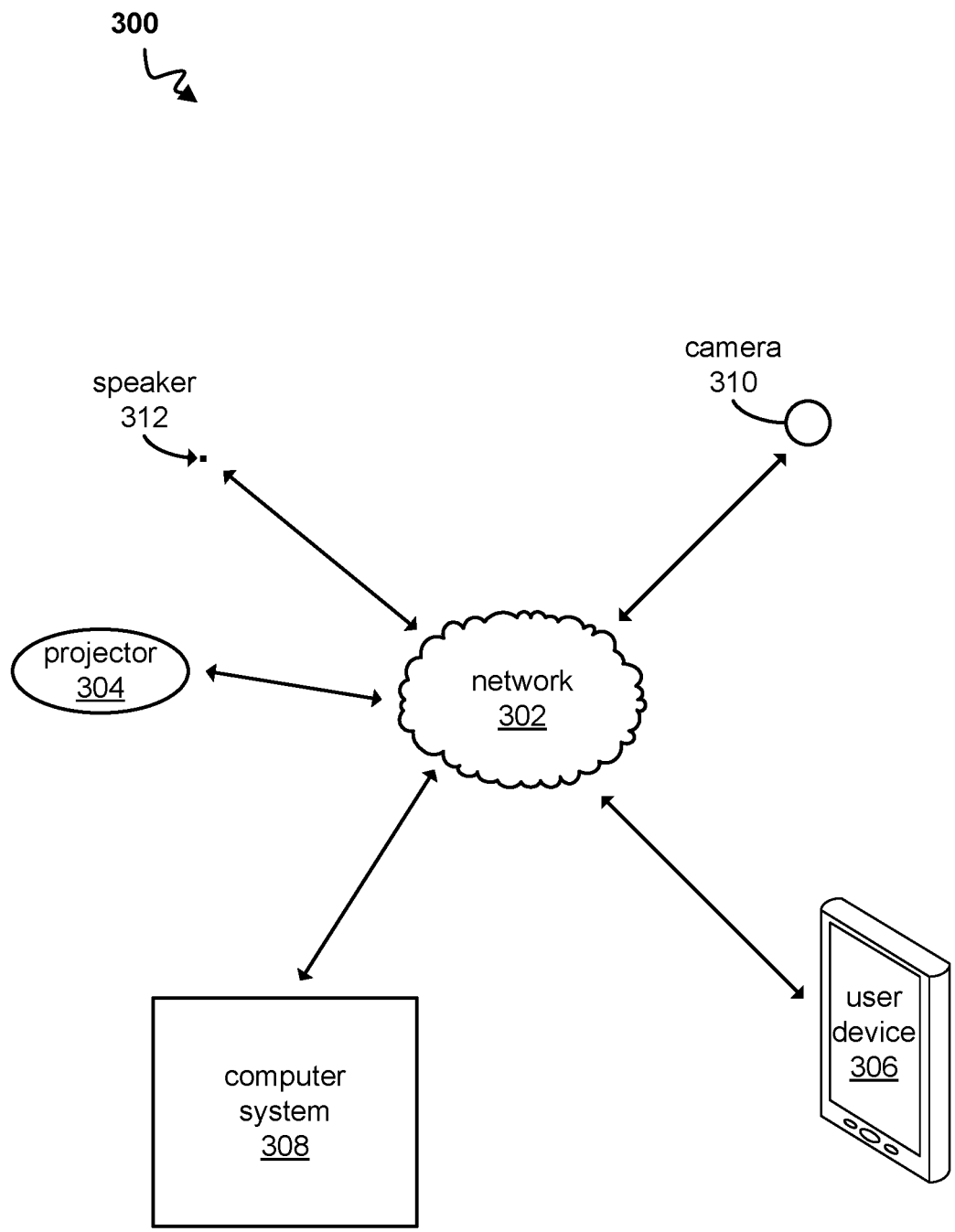
FIG. 3 depicts a block diagram of a smart system for projecting a communication to a user in a smart space, according to embodiments.

FIG. 3 depicts a block diagram of a smart system 300 for projecting a communication to a user in a smart space, according to embodiments. The smart system 300 depicted in FIG. 3 can be carried out on various computer processing circuits, and may comprise the various modules described herein, or may comprise fewer or additional modules.

The smart system may comprise a computer system 308, a set of audiovisual devices including, for example, a projector 304, a speaker 312, and a camera 310. As described herein, there may be more or fewer of each of these devices described, and there may be additional types of devices beyond those presented here. A simplistic diagram of the smart system 300 is provided here for ease of discussion. Each of these devices (projector 304, speaker 312, and camera 310) as well as the user device 306 may be connected to a computer system 308 over a network or networks 302. In embodiments, the devices may be connected to each other and to the computer system, or just to the computer system.

In embodiments, a user device 306 may receive an incoming communication. For example, the user device 306 may receive a call, text message, video conference request, social media notification, or other communication. The user device may be associated with a particular user located in an environment like the one described in FIGS. 1 and 2. Upon entering the smart space, the user device may be connected to the computer system 308 over a network 302. In some embodiments, this may be a wireless Internet connection that is automatically detected by the user device 306. In embodiments, the user device may connect based on a setting, a user selection, or in another way. In embodiments, the user device 306 may connect with the computer system 308 over a network 302 while outside of the smart space. In this way, a user in the smart space could receive communications from a user device 306 with which the user is associated when the user device 306 is in a remote location.

The computer system 308 may receive camera feed data from a camera 310 installed within the smart space. The camera 310 may be similar to the cameras 106 in FIGS. 1 and 206 in FIG. 2, and may be a single or set of cameras installed within the space. The camera 310 may send a continual feed of images to the computer system 308 over the network 302. The computer system 308 may continuously monitor and analyze the feed. The computer system 308 may also analyze the feed at predetermined increments, upon a user prompt, upon receipt of a communication from the user device 306, or based on some other setting or trigger. The computer system 308 may analyze the feed for a physical location of the user in the smart space. The computer system may also analyze the feed to determine in which direction specifically the user is looking (e.g., a facial direction).

Upon receipt of the communication, the user device 306 may notify the computer system 308 over the network 302. The user device 306 may also transmit the communication to the computer system 308 at this time. In embodiments, the user device 306 may not transmit the communication over the network 302 until it receives confirmation or permission from the computer system 308. In embodiments, the computer system 308 may not receive the communication from the user device 306 until it grants permission or accepts the communication. This could be based on a user setting, user input, or automatically.

Upon receipt of the communication or a notification of the communication from the user device 306, the computer system 308 may first confirm the user being monitored is the same user associated with the user device 306. The computer system 308 may then determine, at that time, the specific location and facial direction for the user, based on the analyzing of the camera feed data from camera 310. The computer system 308 can then determine a particular target location for the display or projection of the communication. The computer system 308 can then determine a particular set of audiovisual devices installed within the smart space and connected over the network 302 that are suitable for projection of the received communication to the user. For example, the computer system 308 may determine that projector 304 and speaker 312 are the two devices installed in the room most suitable for projection of the communication at the specific target location. The system can then send the communication data to the projector 304 and speaker 312. For example, a video conference call could be projected to the user in midair.

In embodiments, the computer system 308 can continue to monitor the incoming camera feed data from camera 310 and determine that user has moved locations in the smart space. Responsive to this determination, the computer system 308 can calculate a modified target location for the projection. The computer system 308 can then determine which devices are most suitable for the projection. In an embodiment, the system may determine the same projector 304 and the same speaker 312 are suitable for projection. The system may also determine that the user has moved a step further away from the speaker 312, and adjust the volume of the video conference call accordingly. The system may also determine that, based on the new target location, the projection needs to be shown to the user at a slightly different angle, and the computer system 308 can send adjustment data to the projector, in order to direct it to rotate slightly, to accommodate the new target location.

Figure 4:
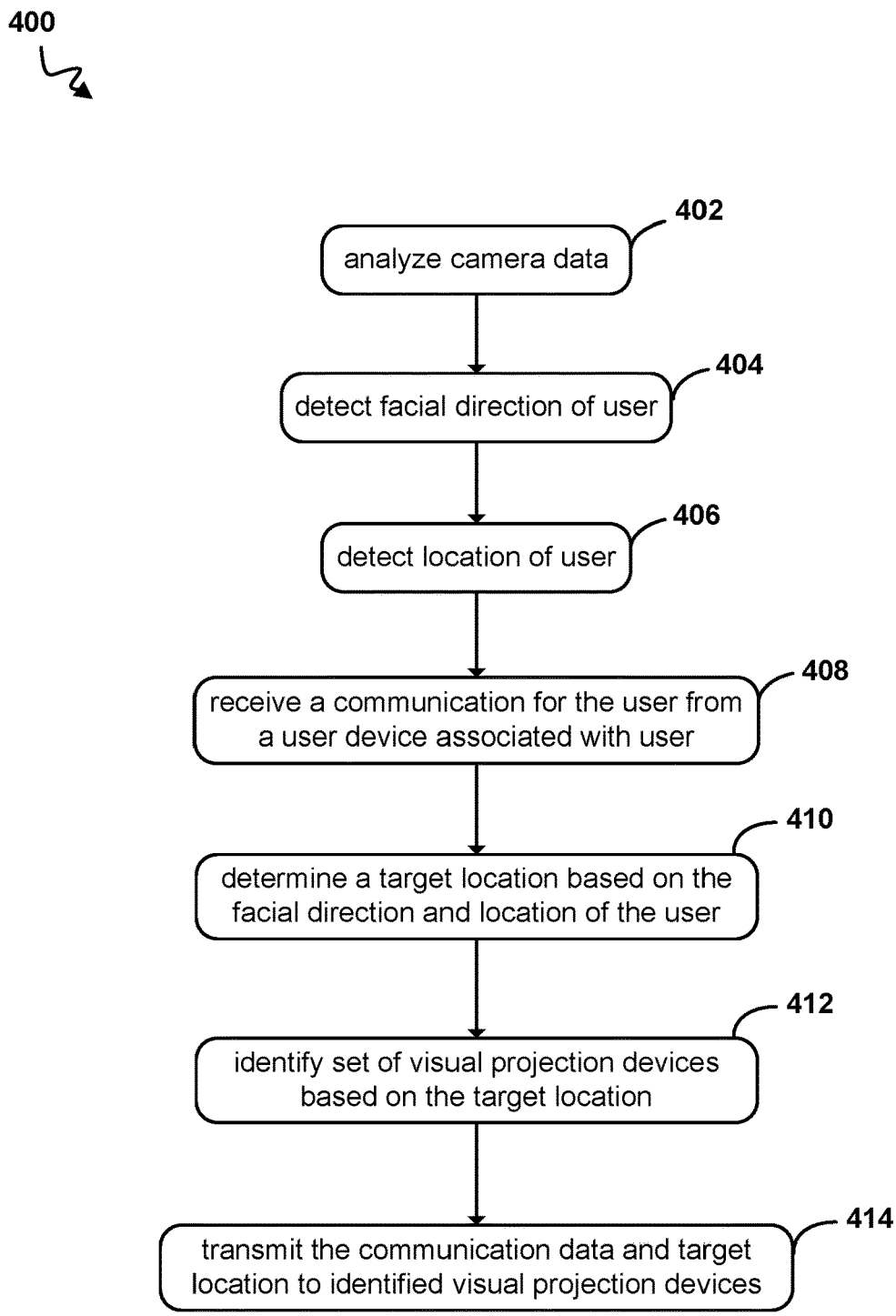
FIG. 4 depicts a flow chart of a method for projecting a digital communication to a user, according to embodiments.

FIG. 4 depicts a flow chart of a method 400 for projecting a digital communication to a user, according to embodiments. The method 400 may begin when a system analyzes incoming camera data, per 402. In embodiments, this camera data may be received via a camera feed from a set of one or more cameras installed within an environment, for example, a smartphone. The analyzing of the camera data could be used by the system in determining the target location. For example, the analyzing of various aspects of camera data could be used to detect or predict a change in the location of the user or the facial direction of the user. In embodiments, the analyzing of the camera data could be used to predict a particular activity in which the user is engaged, in order to avoid projecting the communication to a location. This analyzing of the camera data can include identifying one or more users, pets, objects or other visual aspects of an environment. For example, the system could use a detected pet to determine the particular user was engaged in feeding and watering the pet. From this determination, the system could predict the user would be distracted and unable to view the communication. In this case, and based on settings, the system could then pause the projection, stop the projection, or being to record or save the communication.

In embodiments, the analyzing of the camera data may also include analyzing a livestream feed to determine particular actions or activities carried out by the user. For example, the analyzing could include detecting that two users and a pet are in a particular space in the environment. For example, the analyzing could also include a determination that the particular space is a kitchen. For example, the analyzing could also include a determination that one of the users is making coffee. The analyzing could also identify a user or the pet as a user or pet as a particular user or pet, as associated with a profile which may contain historical, health, scheduling, preference, or other data about the user. This data could then be used to predict a location of the user or a facial direction for the user, in order to provide a more seamless transition between various projection devices and target locations.

In embodiments, based on the analyzing of the camera data, the system could detect a facial direction of the user, per 404. In embodiments, the system could detect the past and current facial directions of the user. For example, the system could detect that the user is looking at a particular angle, at a particular object, or in a particular direction. The system could also anticipate, based on for example, an activity in which the user is participating or historical data, a facial direction for the user. For example, as described above, the system could determine based on camera data analysis that the user is feeding a pet, or that the user historically feeds that particular pet at the particular time. The system could anticipate that the user will face both the cupboard where the pet food is stored as well as the bowl into which the pet food is placed for the feeding. Based on the analyzing, the system can also detect a location of the user, per 406. In embodiments, the location of the user may be detected prior to, following, or concurrent with the detection of facial direction of the user.

In embodiments, one or more user devices may be associated with a particular user detected in the environment. The system may receive a communication for the user from a user device associated with the user, per 408. For example, the system may receive a text message, an email, a video or audio call, or other communication data.

Based on the facial location and location of the user, as detected by the system, a target location may be determined, per 410. For example, the target location may be a location in the environment that is suitable for projection of the communication to the user. The target location may change, as described herein, based on the user's movements, changes in facial direction, or obstructions within the space. Based on the target location determined by the system, a set of visual projection devices may be identified, per 412. The system can transmit the communication data received from the user device and the target location to the identified visual projection devices, per 414. In embodiments, responsive to the transmitting, the visual projection device or devices may be adjusted or self-adjust to an appropriate angle to project the communication to the target location. The visual projection devices may then project, to the location, the communication data.

Figure 5:
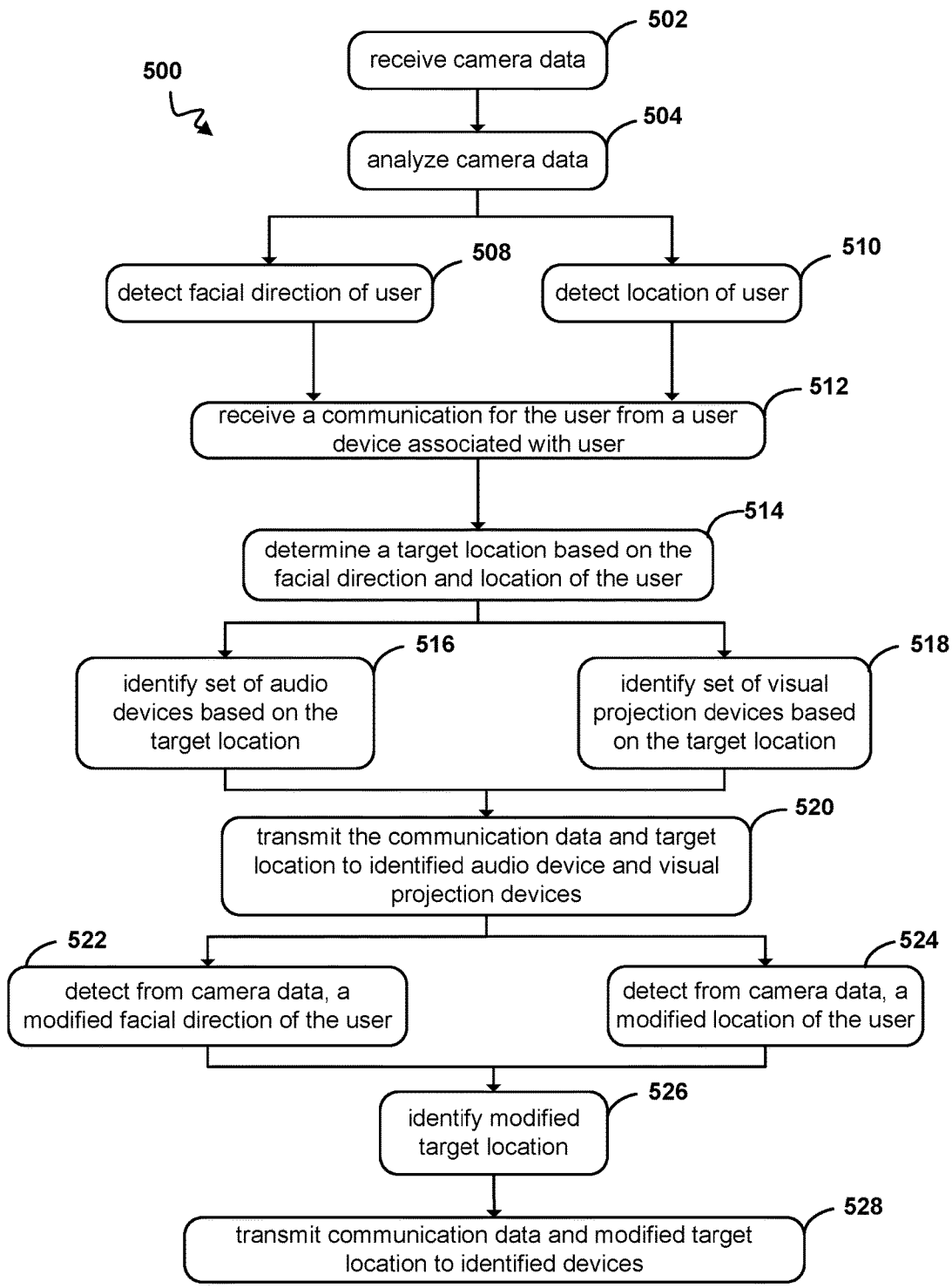
FIG. 5 depicts a flow chart of a method for projecting a communication to a user in real time, according to embodiments.

FIG. 5 depicts a flow chart of a method 500 for projecting a communication to a user in real time, according to embodiments. In embodiments, the method 500 may be performed by a computer processor or processors. In embodiments, the method 500 may be performed in an environment 100 depicted in FIG. 1. The method may begin when a computer system, for example, computer system 308 of FIG. 3, receives camera data, per 502. This camera data may be received directly or over a network from a camera or set of cameras, from a camera system which collects and/or processes camera data, or from another source. The system may then analyze the camera data, per 504. The analyzing may be performed using video content analytics (VCA) software, or in another way. Based on the analyzing, the system may detect a facial direction of the user and a location of the user, per 508 and 510 respectively. In embodiments, this camera analysis and detection may occur in real time, at designated time intervals, in response to a detected communication for the user, or in another way.

In embodiments, responsive to receiving a communication for the user from a user device associated with the user, per 512, the system may determine a target location based on the detected facial direction of the user and the detected location of the user, per 514. In embodiments, the user device may communicate with the computer system, and vice versa, over a network, as described herein (for example in FIG. 3). In embodiments, the system may identify a set of audio devices based on the target location, per 516. Audio devices could include speakers, for example speakers installed within the environment, speakers associated with a device or devices present in the environment, microphones, or other devices suitable for audio communication. The system may also identify a set of visual projection devices based on the target location, per 518. These projection devices could include midair projection devices, pico projectors, or other projection devices capable of projecting visual communications, either midair, on a display screen, on a wall or other surface, or in another way. In embodiments, the audio and visual projection devices may be in communication with the computer system in order to be adjusted responsive to the computer system. For example, a midair projection device may be mounted to a wall using various joints that are controllable by the computer system. For another example, the speaker volume or microphone sensitivity may be controlled by the computer system in order to be adjustable by the computer system.

In embodiments, the system may transmit the target location and the communication data (i.e., the communication received by the computer system for the user from the associated user device) to the identified visual projection and audio devices, per 520. In some cases, the communication may contain only a visual component without an audio component. In these cases, the computer system could transmit the communication only to the visual projection devices. The system could also transmit the communication to both audio devices and video devices, and cause the audio device to generate an audio notification to accompany the visual projection of the communication. In embodiments, this notification could be controlled by a setting.

In embodiments, the system could then detect from camera data a modified facial direction of the user, per 522. The system could also detect a modified location of the user in the environment based on the camera data, per 524. In some examples, only of the facial direction and location may be modified and detected by the user. Based on the modified facial direction, the modified location of the user, or both, the system may identify a modified target location for the communication to be projected, per 526.

In embodiments, the analyzing by the system may also include analyzing the content of the data do determine a level of confidentiality of the communication. In embodiments, the system may determine a communication is marked confidential. The system may also detect, from the camera feed, that there are other users in the environment. In this case, the system may identify a different set of projection devices, in order to allow for a more private projection of the communication. The system may also determine that there are no suitable projection devices available to communicate the confidential message in an appropriate manner. In this instance, the system may notify the user via an audio alert, a notification, or in another way.

In embodiments, the system may then transmit the communication data and the modified target location to the identified devices for projection, per 528, as described above. In embodiments, the system may determine that a different set of audio or visual projection devices are better suited for projecting the communication, based on the modified target location. For example, a user has moved from a standing position to a sitting position, and the system may determine that a lower visual projector is more suitable to projecting the communication than the previously identified visual projection device. The system could then transmit the communication data and the modified target location to the newly identified device. Responsive to the communication, the new device may adjust to project the communication at the modified target location.

Figure 6:
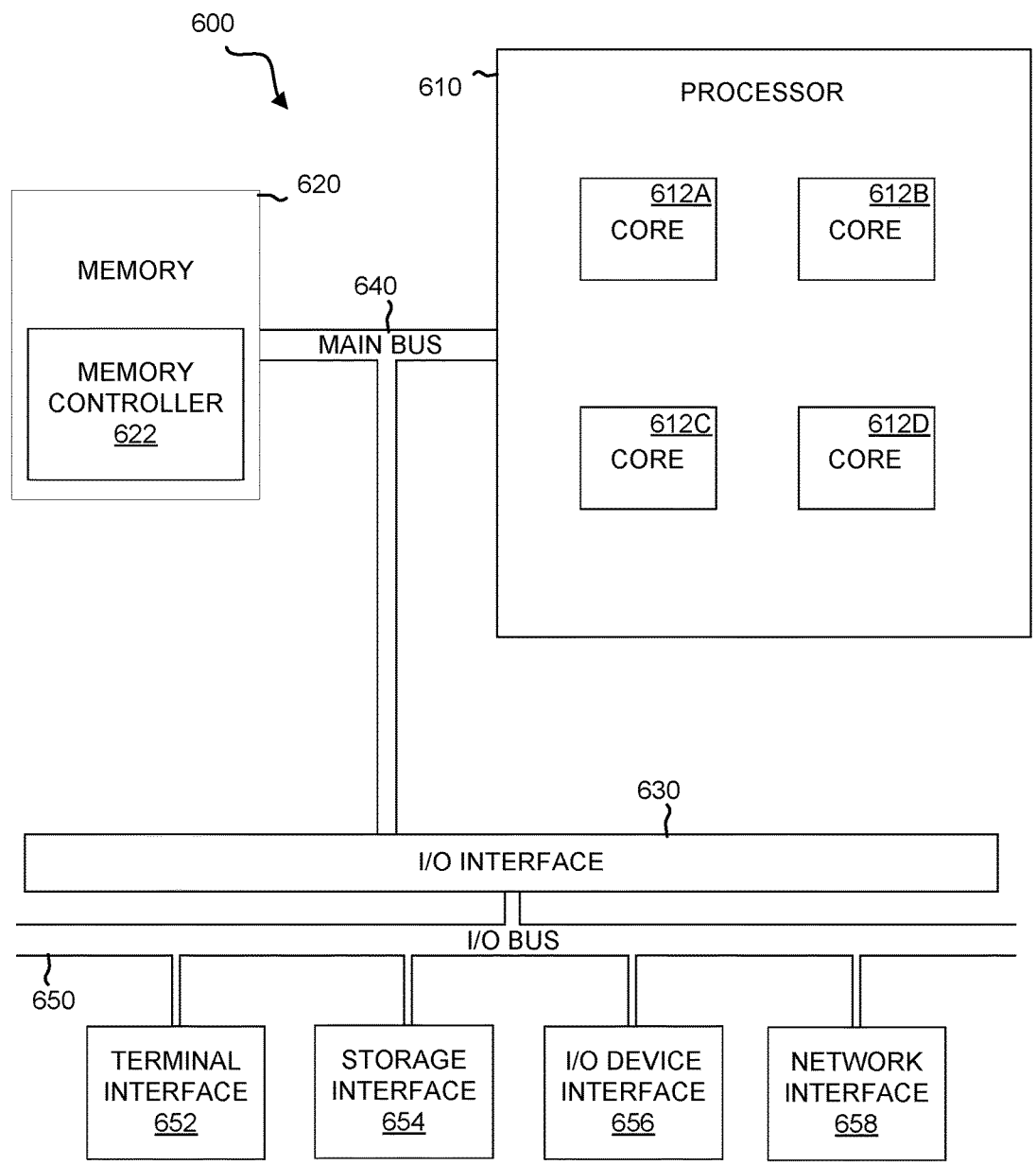
FIG. 6 depicts the representative major components of an example computer system that may be used, according to embodiments.

FIG. 6 depicts the representative major components of an example computer system 600 that may be used, according to embodiments. It is appreciated that individual components may vary in complexity, number, type, and or configuration. The particular examples disclosed are for example purposes only and are not necessarily the only such variations. The computer system 600 may comprise a processor 610, memory 620, an input/output interface (herein I/O or I/O interface) 630, and a main bus 640. The main bus 640 may provide communication pathways for the other components of the computer system 600. In some embodiments, the main bus 640 may connect to other components such as a specialized digital signal processor (not depicted).

The processor 610 of the computer system 600 may be comprised of one or more cores 612A, 612B, 612C, 612D (collectively 612). The processor 610 may additionally include one or more memory buffers or caches (not depicted) that provide temporary storage of instructions and data for the cores 612. The cores 612 may perform instructions on input provided from the caches or from the memory 620 and output the result to caches or the memory. The cores 612 may be comprised of one or more circuits configured to perform one or more methods consistent with embodiments of the present disclosure. In some embodiments, the computer system 600 may contain multiple processors 610. In some embodiments, the computer system 600 may be a single processor 610 with a singular core 612.

The memory 620 of the computer system 601 may include a memory controller 622. In some embodiments, the memory 620 may comprise a random-access semiconductor memory, storage device, or storage medium (either volatile or non-volatile) for storing data and programs. In some embodiments, the memory may be in the form of modules (e.g., dual in-line memory modules). The memory controller 622 may communicate with the processor 610, facilitating storage and retrieval of information in the memory 620. The memory controller 622 may communicate with the I/O interface 630, facilitating storage and retrieval of input or output in the memory 620.

The I/O interface 630 may comprise an I/O bus 650, a terminal interface 652, a storage interface 654, an I/O device interface 656, and a network interface 658. The I/O interface 630 may connect the main bus 640 to the I/O bus 650. The I/O interface 630 may direct instructions and data from the processor 610 and memory 620 to the various interfaces of the I/O bus 650. The I/O interface 630 may also direct instructions and data from the various interfaces of the I/O bus 650 to the processor 610 and memory 620. The various interfaces may include the terminal interface 652, the storage interface 654, the I/O device interface 656, and the network interface 658. In some embodiments, the various interfaces may include a subset of the aforementioned interfaces (e.g., an embedded computer system in an industrial application may not include the terminal interface 652 and the storage interface 654).

Logic modules throughout the computer system 600—including but not limited to the memory 620, the processor 610, and the I/O interface 630—may communicate failures and changes to one or more components to a hypervisor or operating system (not depicted). The hypervisor or the operating system may allocate the various resources available in the computer system 600 and track the location of data in memory 620 and of processes assigned to various cores 612. In embodiments that combine or rearrange elements, aspects and capabilities of the logic modules may be combined or redistributed. These variations would be apparent to one skilled in the art.

It is to be understood that although this disclosure includes a detailed description on cloud computing, implementation of the teachings recited herein are not limited to a cloud computing environment. Rather, embodiments of the present invention are capable of being implemented in conjunction with any other type of computing environment now known or later developed.

Cloud computing is a model of service delivery for enabling convenient, on-demand network access to a shared pool of configurable computing resources (e.g., networks, network bandwidth, servers, processing, memory, storage, applications, virtual machines, and services) that can be rapidly provisioned and released with minimal management effort or interaction with a provider of the service. This cloud model may include at least five characteristics, at least three service models, and at least four deployment models.

Characteristics are as follows:

On-demand self-service: a cloud consumer can unilaterally provision computing capabilities, such as server time and network storage, as needed automatically without requiring human interaction with the service's provider.

Broad network access: capabilities are available over a network and accessed through standard mechanisms that promote use by heterogeneous thin or thick client platforms (e.g., mobile phones, laptops, and PDAs).

Resource pooling: the provider's computing resources are pooled to serve multiple consumers using a multi-tenant model, with different physical and virtual resources dynamically assigned and reassigned according to demand. There is a sense of location independence in that the consumer generally has no control or knowledge over the exact location of the provided resources but may be able to specify location at a higher level of abstraction (e.g., country, state, or datacenter).

Rapid elasticity: capabilities can be rapidly and elastically provisioned, in some cases automatically, to quickly scale out and rapidly released to quickly scale in. To the consumer, the capabilities available for provisioning often appear to be unlimited and can be purchased in any quantity at any time.

Measured service: cloud systems automatically control and optimize resource use by leveraging a metering capability at some level of abstraction appropriate to the type of service (e.g., storage, processing, bandwidth, and active user accounts). Resource usage can be monitored, controlled, and reported, providing transparency for both the provider and consumer of the utilized service.

Service Models are as follows:

Software as a Service (SaaS): the capability provided to the consumer is to use the provider's applications running on a cloud infrastructure. The applications are accessible from various client devices through a thin client interface such as a web browser (e.g., web-based email). The consumer does not manage or control the underlying cloud infrastructure including network, servers, operating systems, storage, or even individual application capabilities, with the possible exception of limited user-specific application configuration settings.

Platform as a Service (PaaS): the capability provided to the consumer is to deploy onto the cloud infrastructure consumer-created or acquired applications created using programming languages and tools supported by the provider. The consumer does not manage or control the underlying cloud infrastructure including networks, servers, operating systems, or storage, but has control over the deployed applications and possibly application hosting environment configurations.

Infrastructure as a Service (IaaS): the capability provided to the consumer is to provision processing, storage, networks, and other fundamental computing resources where the consumer is able to deploy and run arbitrary software, which can include operating systems and applications. The consumer does not manage or control the underlying cloud infrastructure but has control over operating systems, storage, deployed applications, and possibly limited control of select networking components (e.g., host firewalls).

Deployment Models are as follows:

Private cloud: the cloud infrastructure is operated solely for an organization. It may be managed by the organization or a third party and may exist on-premises or off-premises.

Community cloud: the cloud infrastructure is shared by several organizations and supports a specific community that has shared concerns (e.g., mission, security requirements, policy, and compliance considerations). It may be managed by the organizations or a third party and may exist on-premises or off-premises.

Public cloud: the cloud infrastructure is made available to the general public or a large industry group and is owned by an organization selling cloud services.

Hybrid cloud: the cloud infrastructure is a composition of two or more clouds (private, community, or public) that remain unique entities but are bound together by standardized or proprietary technology that enables data and application portability (e.g., cloud bursting for load-balancing between clouds).

A cloud computing environment is service oriented with a focus on statelessness, low coupling, modularity, and semantic interoperability. At the heart of cloud computing is an infrastructure that includes a network of interconnected nodes.

Figure 7:
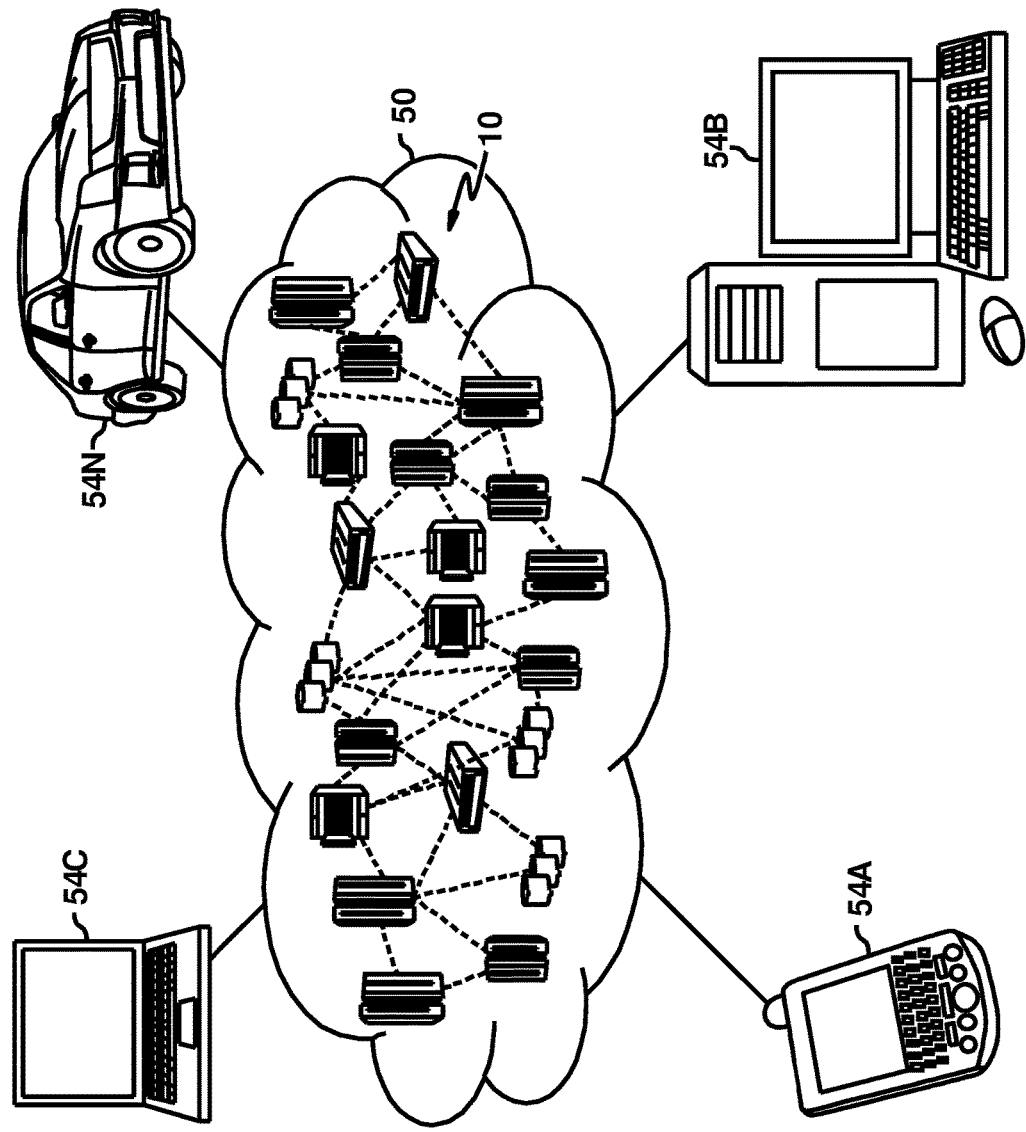
FIG. 7 depicts a cloud computing environment according to embodiments.

Referring now to FIG. 7, illustrative cloud computing environment 50 is depicted. As shown, cloud computing environment 50 includes one or more cloud computing nodes 10 with which local computing devices used by cloud consumers, such as, for example, personal digital assistant (PDA) or cellular telephone 54A, desktop computer 54B, laptop computer 54C, and/or automobile computer system 54N may communicate. Nodes 10 may communicate with one another. They may be grouped (not shown) physically or virtually, in one or more networks, such as Private, Community, Public, or Hybrid clouds as described hereinabove, or a combination thereof. This allows cloud computing environment 50 to offer infrastructure, platforms and/or software as services for which a cloud consumer does not need to maintain resources on a local computing device. It is understood that the types of computing devices 54A-N shown in FIG. 7 are intended to be illustrative only and that computing nodes 10 and cloud computing environment 50 can communicate with any type of computerized device over any type of network and/or network addressable connection (e.g., using a web browser).

Figure 8:
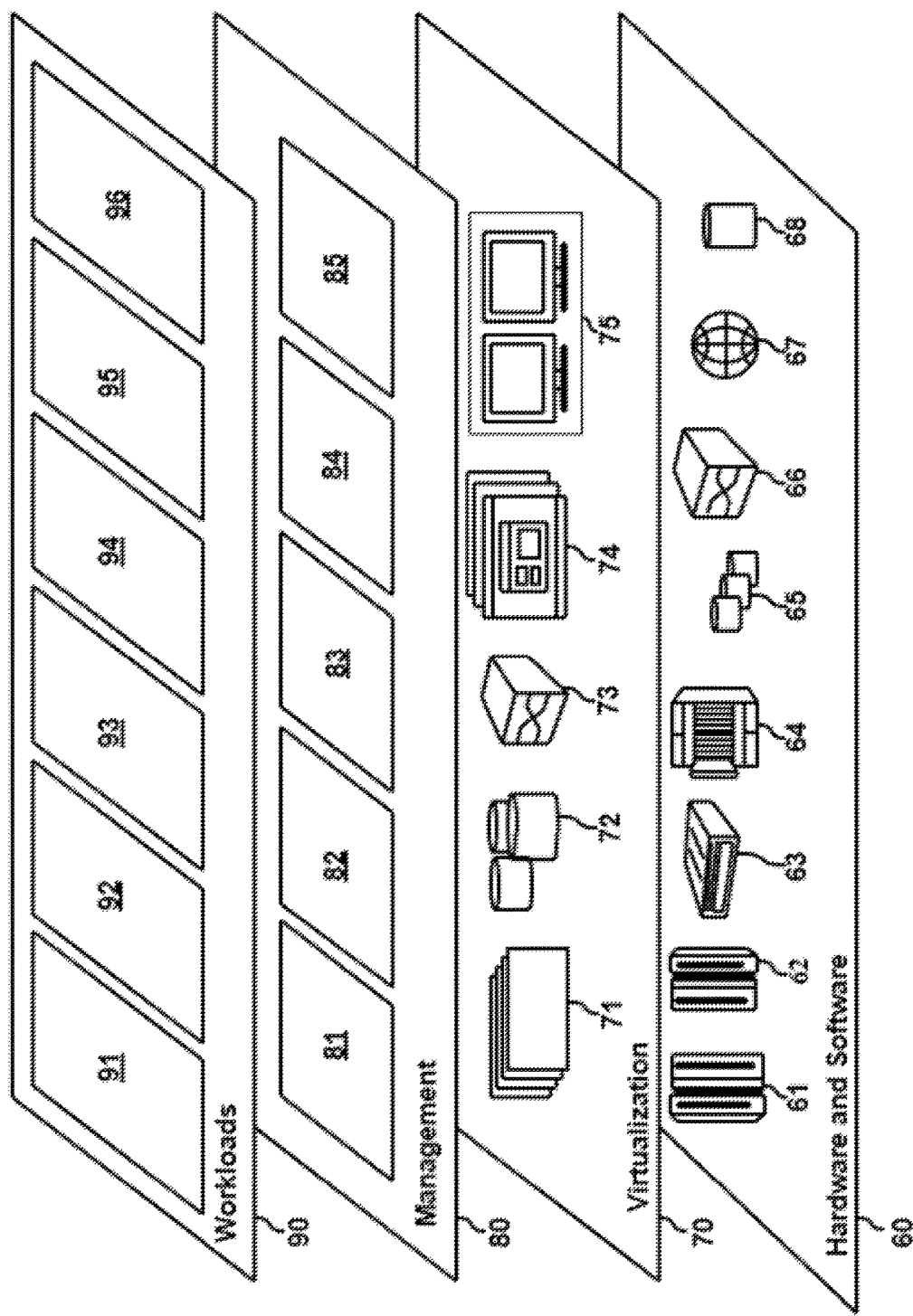
FIG. 8 depicts abstraction model layers according to embodiments.

Referring now to FIG. 8, a set of functional abstraction layers provided by cloud computing environment 50 (FIG. 7) is shown. It should be understood in advance that the components, layers, and functions shown in FIG. 8 are intended to be illustrative only and embodiments of the invention are not limited thereto. As depicted, the following layers and corresponding functions are provided:

Hardware and software layer 60 includes hardware and software components. Examples of hardware components include: mainframes 61; RISC (Reduced Instruction Set Computer) architecture based servers 62; servers 63; blade servers 64; storage devices 65; and networks and networking components 66. In some embodiments, software components include network application server software 67 and database software 68.

Virtualization layer 70 provides an abstraction layer from which the following examples of virtual entities may be provided: virtual servers 71; virtual storage 72; virtual networks 73, including virtual private networks; virtual applications and operating systems 74; and virtual clients 75.

In one example, management layer 80 may provide the functions described below. Resource provisioning 81 provides dynamic procurement of computing resources and other resources that are utilized to perform tasks within the cloud computing environment. Metering and Pricing 82 provide cost tracking as resources are utilized within the cloud computing environment, and billing or invoicing for consumption of these resources. In one example, these resources may include application software licenses. Security provides identity verification for cloud consumers and tasks, as well as protection for data and other resources. User portal 83 provides access to the cloud computing environment for consumers and system administrators. Service level management 84 provides cloud computing resource allocation and management such that required service levels are met. Service Level Agreement (SLA) planning and fulfillment 85 provide pre-arrangement for, and procurement of, cloud computing resources for which a future requirement is anticipated in accordance with an SLA.

Workloads layer 90 provides examples of functionality for which the cloud computing environment may be utilized. Examples of workloads and functions which may be provided from this layer include: mapping and navigation 91; software development and lifecycle management 92; virtual classroom education delivery 93; data analytics processing 94; transaction processing 95; and communication projection 96.

The present invention may be a system, a method, and/or a computer program product at any possible technical detail level of integration. The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, configuration data for integrated circuitry, or either source code or object code written in any combination of one or more programming languages, including an object oriented programming language such as Smalltalk, C++, or the like, and procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the blocks may occur out of the order noted in the Figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

The descriptions of the various embodiments of the present disclosure have been presented for purposes of illustration, but are not intended to be exhaustive or limited to the embodiments disclosed. Many modifications and variations will be apparent to those of ordinary skill in the art without departing from the scope and spirit of the described embodiments. The terminology used herein was chosen to explain the principles of the embodiments, the practical application or technical improvement over technologies found in the marketplace, or to enable others of ordinary skill in the art to understand the embodiments disclosed herein.

What is claimed is:

1. A method comprising:
   analyzing, by a computer system, camera data from a set of one or more cameras;
   detecting, by the computer system and based on the camera data, a facial direction of a user, wherein the user is associated with one or more user devices;
   detecting, by the computer system and based on the camera data, a location for the user;
   receiving, by the computer system and from at least one of one or more user devices associated with the user, a communication for the user, wherein the communication comprises communication data;
   determining, based on the facial direction and location of the user, a target location;
   identifying, based on the target location, a set of one or more visual projection devices for use in projecting the communication data;
   transmitting, to the set of visual projection devices, the communication data and the target location, for projection of the communication data, to the target location, by the set of visual projection devices, wherein the target location is a point in mid-air;
   anticipating, based on a set of historical data for the user, a next facial direction and a next location of the user;
   identifying, based on the next facial direction and the next location of the user, a next set of visual projection devices;
   determining that an obstacle near the target location will prevent the user from viewing the communication data;
   adjusting the target location to allow the user to view the communication data;
   transmitting, to the next set of visual projection devices, the communication data and target location;
   detecting by the computer system and based on the camera data, a modified facial direction of the user;
   determining, based on the modified facial direction for the user, a modified target location;
   identifying, based on the modified target location, a second set of visual projection devices;
   determining that the communication data includes confidential information;
   determining that an untrusted user is within a proximity of the modified target location;
   preventing any transmitting, to the second set of visual projection devices, of the communication data and the modified target location; and
   transmitting to a different set of projection devices, in order to allow for a more private projection of the communication.

2. The method of claim 1 further comprising:
   identifying, based on the target location, a set of one or more audio devices for use in delivery of the communication data; and
   transmitting, to the set of one or more audio devices, the communication data and target location.

3. The method of claim 1 further comprising:
   detecting, by the computer system, that a second user is within the same environment as the user;
   detecting, by the computer system, that the second user is engaged in an activity;
   predicting, using health, preference, and other data about the user, that the user will respond to the activity by changing location;
   altering the target location of the communication data in response to the prediction;
   detecting, by the computer system and based on the camera data, the changed location for the user;
   determining, based on the changed location, a modified target location; and
   identifying, based on the modified target location, a second set of visual projection devices for use in the projecting the communication and a set of one or more microphones.

4. The method of claim 3 further comprising,
   receiving, by the computer system, a set of audio data, wherein the audio data is collected by the set of microphones;
   transmitting, to the user device, the set of audio data.

5. The method of claim 1 further comprising:
   receiving, by the computer system, a set of visual data, wherein the visual data is collected by the set of visual projection devices;
   transmitting, to the user device, the set of visual data.

6. A computer system comprising at least one computer processor circuit configured to perform a method comprising:
   analyzing, by a computer system, camera data from a set of one or more cameras;
   detecting, by the computer system and based on the camera data, a facial direction of a user, wherein the user is associated with one or more user devices;
   detecting, by the computer system and based on the camera data, a location for the user;
   receiving, by the computer system and from at least one of one or more user devices associated with the user, a communication for the user, wherein the communication comprises communication data;
determining, based on the facial direction and location of the user, a target location;
identifying, based on the target location, a set of one or more visual projection devices for use in projecting the communication data;
transmitting, to the set of visual projection devices, the communication data and the target location, for projection of the communication data, to the target location, by the set of visual projection devices, wherein the target location is a point in mid-air;
anticipating, based on a set of historical data for the user, a next facial direction and a next location of the user;
identifying, based on the next facial direction and the next location of the user, a next set of visual projection devices;
determining that an obstacle near the target location will prevent the user from viewing the communication data;
adjusting the target location to allow the user to view the communication data;
transmitting, to the next set of visual projection devices, the communication data and target location;
detecting by the computer system and based on the camera data, a modified facial direction of the user;
determining, based on the modified facial direction for the user, a modified target location;
identifying, based on the modified target location, a second set of visual projection devices;
determining that the communication data includes confidential information;
determining that an untrusted user is within a proximity of the modified target location;
preventing any transmitting, to the second set of visual projection devices, of the communication data and the modified target location; and
transmitting to a different set of projection devices, in order to allow for a more private projection of the communication.

7. The system of claim 6, wherein the method further comprises:
identifying, based on the target location, a set of one or more audio devices for use in delivery of the communication data; and
transmitting, to the set of one or more audio devices, the communication data and target location.

8. The system of claim 6, wherein the method further comprises:
detecting, by the computer system, that a second user is within the same environment as the user;
detecting, by the computer system, that the second user is engaged in an activity;
predicting, using health, preference, and other data about the user, that the user will respond to the activity by changing location;
altering the target location of the communication data in response to the prediction;
detecting, by the computer system and based on the camera data, the changed location for the user;
determining, based on the changed location, a modified target location; and
identifying, based on the modified target location, a second set of visual projection devices for use in the projecting the communication and a set of one or more microphones.

9. The system of claim 8, wherein the method further comprises:
receiving, by the computer system, a set of audio data, wherein the audio data is collected by the set of microphones; and
transmitting, to the user device, the set of audio data.

10. The system of claim 6, wherein the method further comprises:
receiving, by the computer system, a set of visual data, wherein the visual data is collected by the set of visual projection devices;
transmitting, to the user device, the set of visual data.

11. A computer program product comprising a computer readable storage medium having program instructions embodied therewith, wherein the computer readable storage medium is not a transitory signal per se, the program instructions executable by a computer processing circuit to cause the circuit to perform a method comprising:
analyzing, by a computer system, camera data from a set of one or more cameras;
detecting, by the computer system and based on the camera data, a facial direction of a user, wherein the user is associated with one or more user devices;
detecting, by the computer system and based on the camera data, a location for the user;
receiving, by the computer system and from at least one of one or more user devices associated with the user, a communication for the user, wherein the communication comprises communication data;
determining, based on the facial direction and location of the user, a target location;
identifying, based on the target location, a set of one or more visual projection devices for use in projecting the communication data;
transmitting, to the set of visual projection devices, the communication data and the target location, for projection of the communication data, to the target location, by the set of visual projection devices, wherein the target location is a point in mid-air;
anticipating, based on a set of historical data for the user, a next facial direction and a next location of the user;
identifying, based on the next facial direction and the next location of the user, a next set of visual projection devices;
determining that an obstacle near the target location will prevent the user from viewing the communication data;
adjusting the target location to allow the user to view the communication data;
transmitting, to the next set of visual projection devices, the communication data and target location;
detecting by the computer system and based on the camera data, a modified facial direction of the user;
determining, based on the modified facial direction for the user, a modified target location;
identifying, based on the modified target location, a second set of visual projection devices;
determining that the communication data includes confidential information;
determining that an untrusted user is within a proximity of the modified target location;
preventing any transmitting, to the second set of visual projection devices, of the communication data and the modified target location; and
transmitting to a different set of projection devices, in order to allow for a more private projection of the communication.

12. The computer program product of claim 11, wherein the method further comprises:

identifying, based on the target location, a set of one or more audio devices for use in delivery of the communication data; and transmitting, to the set of one or more audio devices, the communication data and target location.

13. The computer program product of claim 11, wherein the method further comprises:

detecting, by the computer system, that a second user is within the same environment as the user;

detecting, by the computer system, that the second user is engaged in an activity;

predicting, using health, preference, and other data about the user, that the user will respond to the activity by changing location;

altering the target location of the communication data in response to the prediction;

detecting, by the computer system and based on the camera data, the changed location for the user;

determining, based on the changed location, a modified target location; and identifying, based on the modified target location, a second set of visual projection devices for use in the projecting the communication and a set of one or more microphones.

14. The computer program product of claim 13, wherein the method further comprises:

receiving, by the computer system, a set of audio data, wherein the audio data is collected by the set of microphones; and transmitting, to the user device, the set of audio data.

* * * * *